(12) United States Patent
Sonoda et al.

(10) Patent No.: US 11,975,605 B2
(45) Date of Patent: May 7, 2024

(54) TRAVELING TRANSMISSION DEVICE FOR TRACTOR

(71) Applicant: KUBOTA CORPORATION, Osaka (JP)

(72) Inventors: Shunsuke Sonoda, Osaka (JP); Kenichiro Tsuji, Osaka (JP); Hiroki Takemoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 396 days.

(21) Appl. No.: 17/599,788

(22) PCT Filed: Apr. 2, 2020

(86) PCT No.: PCT/JP2020/015218
§ 371 (c)(1),
(2) Date: Sep. 29, 2021

(87) PCT Pub. No.: WO2020/213421
PCT Pub. Date: Oct. 22, 2020

(65) Prior Publication Data
US 2022/0153132 A1 May 19, 2022

(30) Foreign Application Priority Data
Apr. 17, 2019 (JP) .................. 2019-078476

(51) Int. Cl.
*B60K 17/02* (2006.01)
*B60K 17/348* (2006.01)

(52) U.S. Cl.
CPC ............ *B60K 17/348* (2013.01); *B60K 17/02* (2013.01); *B60Y 2200/221* (2013.01)

(58) Field of Classification Search
CPC .............................. B60K 17/348; B60K 17/02
See application file for complete search history.

(56) References Cited

U.S. PATENT DOCUMENTS

| | | | | |
|---|---|---|---|---|
| 2010/0184551 A1* | 7/2010 | Hiraoka | ................. | F16H 47/04 475/80 |
| 2012/0322615 A1* | 12/2012 | Matsuzaki | ............ | F16H 61/061 477/79 |
| 2017/0284510 A1* | 10/2017 | Iwaki | ................... | F16H 57/031 |

FOREIGN PATENT DOCUMENTS

| JP | 11-78586 | 3/1999 |
|---|---|---|
| JP | 2008-143411 A | 6/2008 |
| JP | 4707356 B2 * | 6/2011 |

OTHER PUBLICATIONS

International Search Report issued in International Patent Application No. PCT/JP2020/015218, dated Jul. 7, 2020, along with English translation thereof.

(Continued)

*Primary Examiner* — Stacey A Fluhart
(74) *Attorney, Agent, or Firm* — GREENBLUM & BERNSTEIN, P.L.C.

(57) ABSTRACT

A front wheel clutch and a front wheel acceleration clutch are supported to a front wheel transmission shaft. Between the front wheel clutch and the front wheel acceleration clutch, there is provided a holder supporting the front wheel transmission shaft. A first operational oil passage for switching over the front wheel clutch is defined respectively in and between the holder and the front wheel transmission shaft. A second operational oil passage for switching over the front wheel acceleration clutch is defined respectively in and between the holder and the front wheel transmission shaft.

15 Claims, 8 Drawing Sheets

(56) References Cited

OTHER PUBLICATIONS

Written Opinion of the International Searching Authority issued in International Patent Application No. PCT/JP2020/015218, dated Jul. 7, 2020, along with English translation thereof.
Extended European Search Report dated May 11, 2023 in EPO application No. 20791216.3.

* cited by examiner

TRAVELING TRANSMISSION DEVICE FOR TRACTOR

FIELD OF THE INVENTION

The present invention relates to a traveling transmission device for a tractor including a front wheel differential mechanism transmitting power to left and right front wheels, a rear wheel differential mechanism transmitting power to left and right rear wheels, and a transmission configured to input power from a power source and to transmit the inputted power to the front wheel differential mechanism and the rear wheel differential mechanism.

DESCRIPTION OF RELATED ART

In the traveling transmission device for a tractor described above, as disclosed in e.g. Patent Document 1, there is known an arrangement as follows. Namely, a transmission shaft transmitting power to the front wheel differential mechanism mounts an equal-speed clutch and an acceleration clutch. If the acceleration clutch is disengaged and the equal-speed clutch is engaged, the power transmitted to the rear wheel differential mechanism is transmitted to the transmission shaft such that the rear wheels and the front wheels are rotated at substantially same circumferential speeds. And, if the equal-speed clutch is disengaged and the acceleration clutch is engaged, the power transmitted to the rear wheel differential mechanism is accelerated and transmitted as such to the transmission shaft. Further, if both the acceleration clutch and the equal-speed clutch are disengaged, no power is transmitted to the front wheels, so the tractor is driven only by the rear wheels.

In the arrangement disclosed in Patent Document 1, a clutch body of the equal-speed clutch and a clutch body of the acceleration clutch are formed integrally and mounted as such on the transmission shaft.

RELATED ART DOCUMENT

Patent Document

Patent Document 1: Japanese Unexamined Patent Application No. 2008-143411.

SUMMARY

Problem to be Solved by Invention

With the tractor traveling transmission device described above, the front wheel transmission shaft mounts thereon a front wheel clutch that can be switched over between an engaged state for transmitting power to the front wheel transmission shaft in such a manner that an average circumferential speed of the left and right front wheels is set equal to an average circumferential speed of the left and right rear wheels and a disengaged state for disconnecting power transmission to the front wheel transmission shaft and a front wheel acceleration clutch that can be switched over between an engaged state for transmitting power to the front wheel transmission shaft in such a manner that the average circumferential speed of the left and right front wheels is set higher than the average circumferential speed of the left and right rear wheels and a disengaged state for disconnecting power transmission to the front wheel transmission shaft. With this arrangement, there can be realized a two-wheel drive state in which of the front wheels and the rear wheels, only the rear wheels are driven, a front-rear wheel equal-speed four-wheel drive state in which the average circumferential speed of the left and right front wheels is equal to the average circumferential speed of the left and right rear wheels and a front-wheel accelerated four-wheel drive state in which the average circumferential speed of the left and right front wheels is set higher than the average circumferential speed of the left and right rear wheels. In this type of tractor traveling transmission device, a first operational oil passage for switching over the front wheel clutch and a second operational oil passage for switching over the front wheel acceleration clutch are to be formed in the front wheel transmission shaft. If the conventional technique is employed for this purpose, the first operational oil passage and the second operational oil passage are extended toward the front wheel clutch and the front wheel acceleration clutch as targets of their operations, from a portion of the front wheel transmission shaft opposite to the side where the other clutch is present relative to the one clutch of the front wheel clutch and the acceleration clutch. Thus, one operational oil passage of the first operational oil passage and the second operational oil passage is disposed side by side in the radial direction of the front wheel transmission shaft relative to the other operational oil passage, at the portion on the opposite side to the clutch side. This juxtaposition results in increase in the length of the operational oil passage.

With this type of tractor traveling transmission device, lubricant oil present inside the transmission case is stirred by a rotational motion of the front wheel acceleration clutch, so the speed of the rotational motion of the front wheel acceleration clutch is increased for front wheel acceleration. As such, it is desired to suppress a temperature rise of the lubricant oil associated with such stirring of the lubricant oil by the front wheel acceleration clutch.

In a traveling transmission device for a tractor configured to realize a two-wheel drive state, a front-rear wheel equal speed four-wheel drive state and a front-wheel accelerated four-wheel drive state, the present invention provides an improved traveling transmission device for a tractor with an inventive arrangement which makes it possible to keep the lengths of the operational oil passages short and provides also an improved traveling transmission device for a tractor with an inventive arrangement which allows suppression of temperature rise of lubricant oil associated with a rotational motion of a front wheel acceleration clutch in an inexpensive manner.

Solutions

According to one aspect of the present invention, there is provided a traveling transmission device for a tractor, comprising:
  a front wheel differential mechanism transmitting power to left and right front wheels;
  a rear wheel differential mechanism transmitting power to left and right rear wheels; and
  a transmission configured to input power from a power source and to transmit the inputted power to the front wheel differential mechanism and the rear wheel differential mechanism;
  wherein the transmission includes:
    a front wheel transmission shaft transmitting power to the front wheel differential mechanism;
    a front wheel clutch that can be switched over between an engaged state for transmitting power to the front wheel transmission shaft in such a manner that an average circumferential speed of the left and right front wheels is set equal to an average circumferential speed of the left and right rear wheels and a disengaged state for disconnecting power transmission to the front wheel transmission shaft; and a front wheel acceleration clutch that can be switched over between an engaged state for transmitting power to the front wheel transmission shaft in such a manner that the average circumferential speed of the left and right front wheels is set higher than the average circumferential speed of the left and right rear wheels and a disengaged state for disconnecting power transmission to the front wheel transmission shaft;

wherein the front wheel clutch and the front wheel acceleration clutch are supported to the front wheel transmission shaft side by side in an axis direction of the front wheel transmission shaft;

wherein between the front wheel clutch and the front wheel acceleration clutch, there is provided a holder rotatably supporting the front wheel transmission shaft;

wherein a first operational oil passage for switching over the front wheel clutch is formed respectively in and between the front wheel transmission shaft and the holder; and wherein a second operational oil passage for switching over the front wheel acceleration clutch is formed respectively in and between the front wheel transmission shaft and the holder.

With the above-described arrangement, when the front wheel clutch is switched to the disengaged state and the front wheel acceleration clutch is also switched to the disengaged state, the power transmission to the front wheel transmission shaft is disconnected, so no power is transmitted to the front wheel differential mechanism. As a result, of the front wheels and the rear wheels, only the rear wheels are driven. When the front wheel clutch is switched to the engaged state and the front wheel acceleration clutch is switched to the disengaged state, power is transmitted to the front wheel transmission shaft in such a manner that an average circumferential speed of the left and right front wheels is set equal to an average circumferential speed of the rear wheels. As a result, the front wheels and the rear wheels are driven with the average circumferential speed of the left and right front wheels being set equal to the average circumferential speed of the rear wheels. Further, when the front wheel clutch is switched to the disengaged state and the front wheel acceleration clutch is switched to the engaged state, power is transmitted to the front wheel transmission shaft in such a manner that the average circumferential speed of the left and right front wheels is set higher than the average circumferential speed of the rear wheels. As a result, the front wheels and the rear wheels are driven with the average circumferential speed of the left and right front wheels being set higher than the average circumferential speed of the rear wheels.

The portion of the first operational oil passage positioned in the front wheel transmission shaft extends from the portion of the front wheel transmission shaft corresponding to the holder to the portion of the front wheel transmission shaft corresponding to the front wheel clutch. The portion of the second operational oil passage positioned in the front wheel transmission shaft extends from the portion of the front wheel transmission shaft corresponding to the holder to the portion of the front wheel transmission shaft corresponding to the front wheel clutch. Thus, in this front wheel transmission shaft, the first operational oil passage and the second operational oil passage are not disposed side by side in the radial direction of the front wheel transmission shaft.

Therefore, in the arrangement in which the two-wheel drive state involving driving of the rear wheels only, the front-rear wheel equal-speed four-wheel drive state and the front wheel accelerated four-wheel drive state can be realized and the first operational oil passage and the second operational oil passage are formed in the front wheel transmission shaft, the above-described inventive arrangement makes it possible to keep the lengths of the first and second operational oil passages short.

In the present invention, preferably:
the holder includes a supporting portion rotatably engageable with a rotational member of the front wheel acceleration clutch for supporting the rotational member; and
a bearing is interposed between the rotational member and the supporting portion.

With the above-described arrangement, thanks to a supporting arrangement having a simple structure utilizing the holder as a supporting member for the rotational member, the front wheel acceleration clutch can be supported in a reliable manner with allowing its smooth rotation.

In the present invention, preferably:
a transmission case is provided for accommodating the transmission;
the holder is provided separately of the transmission case and supported to one wall portion of the transmission case;
a second holder is provided for rotatably supporting the front wheel transmission shaft at a position opposite to the front wheel clutch relative to the front wheel acceleration clutch; and
the second holder is provided separately of the transmission case and supported to a further wall portion of the transmission case than the one wall portion.

With the above-described arrangement, without need to provide a wall portion of the transmission case with a supporting portion for the front wheel transmission shaft, the front wheel transmission shaft can be supported by the second holder on the side opposite to the front wheel clutch relative to the front wheel acceleration clutch. Thus, the transmission shaft can have a simple shape, yet, the front wheel transmission shaft and the front wheel acceleration clutch can be supported in a reliable manner.

In the present invention, preferably, there is provided a spacer coupled to a portion of the holder apart from the one wall portion of the holder and a portion of the second holder apart from the further wall portion and configured to set a spacing between the holder and the second holder.

With the above-described arrangement, between a portion of the holder apart from the one wall portion of the holder and a portion of the second holder apart from the further wall portion, the spacer can set an appropriate spacing for suitably positioning the front wheel acceleration clutch between the holder and the second holder. Therefore, although the holder and the second holder are supported in a cantilever manner to the wall portions, the front wheel transmission shaft and the front wheel acceleration clutch can be supported in a reliable manner.

In the present invention, preferably: the traveling transmission device further comprises:
a first urging member urging the front wheel clutch to the engaged state;
a first hydraulic piston provided in the front wheel clutch and operable by pressure oil supplied via the first operational oil passage for operating the front wheel clutch to the disengaged state against the first urging member;

a second urging member urging the front wheel acceleration clutch to the disengaged state;

a second hydraulic piston provided in the front wheel acceleration clutch and operable by pressure oil supplied via the second operational oil passage for operating the front wheel acceleration cutch to the engaged state against the second urging member;

the first urging member being provided between the front wheel clutch and the holder; and an urging force transmitting member slidably supported to the front wheel transmission shaft and configured to transmit an urging force of the first urging member to the first hydraulic piston.

With the above-described arrangement, even if oil pressure supply to the first hydraulic piston and the second hydraulic piston is stopped due to stop of an oil pressure supply source in the case of e.g. stopping of an engine, the front wheel clutch is switched to the engaged state by the first urging member and the front wheel acceleration clutch is switched to the disengaged state by the second urging member, so that the front wheels can be connected to a brake via the front wheel clutch. As the first urging member is located at a position apart from the front wheel clutch, in comparison with an urging member mounted to the front wheel clutch, a stronger urging force can be provided by e.g. enlarging the first urging member. Thus, the front wheel clutch can be reliably maintained under the engaged state by the first urging member, against a rotational operation force from the front wheels.

Namely, in a sloped land, even if the pressure oil supply to the first hydraulic piston and the second hydraulic piston is stopped, the vehicle body can be braked in a reliable manner.

In the present invention, preferably, the first urging member comprises a disc spring.

With the above-described arrangement, it is possible to provide the first urging member with a strong urging force for urging the front wheel clutch to the engaged state, while minimizing the space needed for mounting the first urging member.

In the present invention, preferably: the traveling transmission device further comprises:

a rear wheel transmission shaft provided parallel with the front wheel transmission shaft and transmitting power to the rear wheel differential mechanism; and an emergency brake provided in the rear wheel transmission shaft, an outer circumferential portion of the emergency brake being interposed between the front wheel clutch and the disc spring.

With the above-described arrangement, the space available between the front wheel clutch and the disc spring is utilized as a space for disposing the emergency brake. Thus, the arrangement including such emergency brake can be formed compact.

In the present invention, preferably: the traveling transmission device further comprises:

a transmission case accommodating the transmission, the front wheel acceleration clutch being disposed downwardly of an inside space of the transmission case; and an acceleration clutch cover provided in the inside space and covering the front wheel acceleration clutch, the acceleration clutch cover having an upwardly formed opening.

With the above-described arrangement, lubricant oil stored inside the transmission case flows to the inside of the acceleration clutch cover via the opening. Thus, the lubricant oil can be stored in an area around the front wheel acceleration clutch within the inside space of the transmission case. With this, the lubricant oil present in the area around the front wheel acceleration clutch will be stirred by a rotational motion of the front wheel acceleration clutch. However, as the acceleration clutch cover provides a wave preventing action to the stirred lubricant oil, the effect of stirring by the front wheel acceleration clutch will hardly be extended to the area apart from the area around the front wheel acceleration clutch, so that undesirable rise of temperature of the lubricant oil inside the transmission case can be suppressed.

In the present invention, preferably: the traveling transmission device further comprises:

a transmission case accommodating the transmission, the front wheel clutch being disposed downwardly of an inside space of the transmission case; and a front wheel clutch cover provided in the inside space and covering the front wheel clutch, the front wheel clutch cover having an upwardly formed opening.

With the above-described arrangement, lubricant oil stored inside the transmission case flows to the inside of the front wheel clutch cover via the opening. Thus, the lubricant oil can be stored in an area around the front wheel clutch within the inside space of the transmission case. With this, the lubricant oil present in the area around the front wheel clutch will be stirred by a rotational motion of the front wheel clutch. However, as the front wheel clutch cover provides a wave preventing action to the stirred lubricant oil, the effect of stirring by the front wheel clutch will hardly be extended to the area apart from the area around the front wheel clutch, so that undesirable rise of temperature of the lubricant oil inside the transmission case can be suppressed.

According to a further aspect of the present invention, there is provided a traveling transmission device for a tractor, comprising:

a front wheel differential mechanism transmitting power to left and right front wheels;

a rear wheel differential mechanism transmitting power to left and right rear wheels;

a transmission configured to input power from a power source and to transmit the inputted power to the front wheel differential mechanism and the rear wheel differential mechanism; and a transmission case accommodating the transmission;

wherein the transmission includes:

a front wheel transmission shaft transmitting power to the front wheel differential mechanism;

a front wheel clutch transmitting power to the front wheel transmission shaft in such a manner that an average circumferential speed of the left and right front wheels is set equal to an average circumferential speed of the left and right rear wheels; and a front wheel acceleration clutch transmitting power to the front wheel transmission shaft in such a manner that the average circumferential speed of the left and right front wheels is set higher than the average circumferential speed of the left and right rear wheels, the front wheel acceleration clutch being disposed downwardly of an inside space of the transmission case;

an acceleration clutch cover provided in the inside space and covering the front wheel acceleration clutch, the acceleration clutch cover having an upwardly formed opening.

With the above-described arrangement, lubricant oil stored inside the transmission case flows to the inside of the acceleration clutch cover via the opening. Thus, the lubricant oil can be stored in an area around the front wheel acceleration clutch within the inside space of the transmission case. With this, the lubricant oil present in the area around the front wheel acceleration clutch will be stirred by a rotational motion of the front wheel acceleration clutch. However, as the acceleration clutch cover provides a wave preventing action to the stirred lubricant oil, the effect of stirring by the front wheel acceleration clutch will hardly be extended to the area apart from the area around the front wheel acceleration clutch, so that undesirable rise of temperature of the lubricant oil inside the transmission case can be suppressed. Since the solution requiring only simple arrangement of providing an acceleration clutch cover, temperature rise suppression can be provided inexpensively.

In the present invention, preferably: the traveling transmission device further comprises a rear wheel transmission shaft provided upwardly of the front wheel transmission shaft and transmitting power to the rear wheel differential mechanism, and
wherein an upper end of the acceleration clutch cover is positioned at a same height as an axis of the rear wheel transmission shaft or at a position higher than the axis.

With this type of traveling transmission device, in general, lubricant oil is stored in the transmission case, with the oil surface being located at a position where the axis of the rear wheel transmission shaft is present or at a position higher than the axis. With the inventive arrangement described above, since the upper end of the acceleration clutch cover is located near the oil surface, the acceleration clutch cover can provide reliably the wave-preventing action to the lubricant oil stirred by the rotational motion of the front wheel acceleration clutch. As a result, temperature rise of the lubricant oil by a rotational action of the front wheel acceleration clutch can be suppressed effectively.

In the present invention, preferably, the acceleration clutch cover includes a lower cover portion positioned downwardly of an upper end portion of the front wheel acceleration clutch and an upper cover portion extended upwards from the lower cover portion.

For lubricant oil flowing upwards by the stirring by the front wheel acceleration clutch, the upper cover portion provides the wave-preventing action, so temperature rise of the lubricant oil associated with a rotational action of the front wheel acceleration clutch can be effectively suppressed.

In the present invention, preferably:
the front wheel acceleration clutch has a clutch drum having opposed side portions;
the lower cover portion includes a first side wall portion corresponding to one side portion rotated in a rising direction as seen in a direction along a rotational axis of the clutch drum at the time of transmission of forward traveling power and a second side wall portion corresponding to the other side portion rotated in a descending direction as seen in the direction at the time of transmission of forward traveling power; and
the upper cover portion is extended upwards from only the first side portion of the first side portion and the second side portion.

Of the lubricant oil rising as being stirred by the side portion rotating in the rising direction and the lubricant oil descending as being stirred by the side portion rotating in the descending direction, the upper cover portion provides its wave-preventing action to the lubricant oil rising which is generated at the time of forward traveling effected more frequently than the reverse traveling. Thus, although the acceleration clutch cover has only a simple arrangement involving extending the upper cover portion from only the first side portion, the stirring by the front wheel acceleration clutch will hardly be extended to the lubricant oil located in the area apart from the area around the front wheel acceleration clutch, and temperature rise of the lubricant oil associated with a rotational action of the front wheel acceleration clutch can be effectively suppressed.

In the present invention, preferably:
the front wheel clutch is disposed downwardly of an inside space of the transmission case; and
a front wheel cover clutch is provided in the inside space for covering the front wheel clutch.

With the above-described arrangement, the lubricant oil present in the area around the front wheel clutch will be stirred by a rotational motion of the front wheel clutch. However, as the front wheel clutch cover provides a wave preventing action to the stirred lubricant oil, the effect of stirring by the front wheel clutch will hardly be extended to the area apart from the area around the front wheel clutch, so that undesirable rise of temperature of the lubricant oil inside the transmission case can be suppressed.

In the present invention, preferably: the traveling transmission device further comprises a rear wheel transmission shaft provided upwardly of the front wheel transmission shaft and transmitting power to the rear wheel differential mechanism, and
wherein an upper end of the front wheel clutch cover is positioned at a same height as an axis of the rear wheel transmission shaft or at a position higher than the axis.

With this type of traveling transmission device, in general, lubricant oil is stored in the transmission case, with the oil surface being located at a position where the axis of the rear wheel transmission shaft is present or at a position higher than the axis. With the inventive arrangement described above, since the upper end of the front wheel clutch cover is located near the oil surface, so the front wheel clutch cover can provide reliably the wave-preventing action to the lubricant oil stirred by the rotational motion of the front wheel clutch. As a result, temperature rise of the lubricant oil by a rotational action of the front wheel clutch can be suppressed effectively.

EMBODIMENT

Next, an embodiment as one example of the present invention will be explained.

Figure 1:
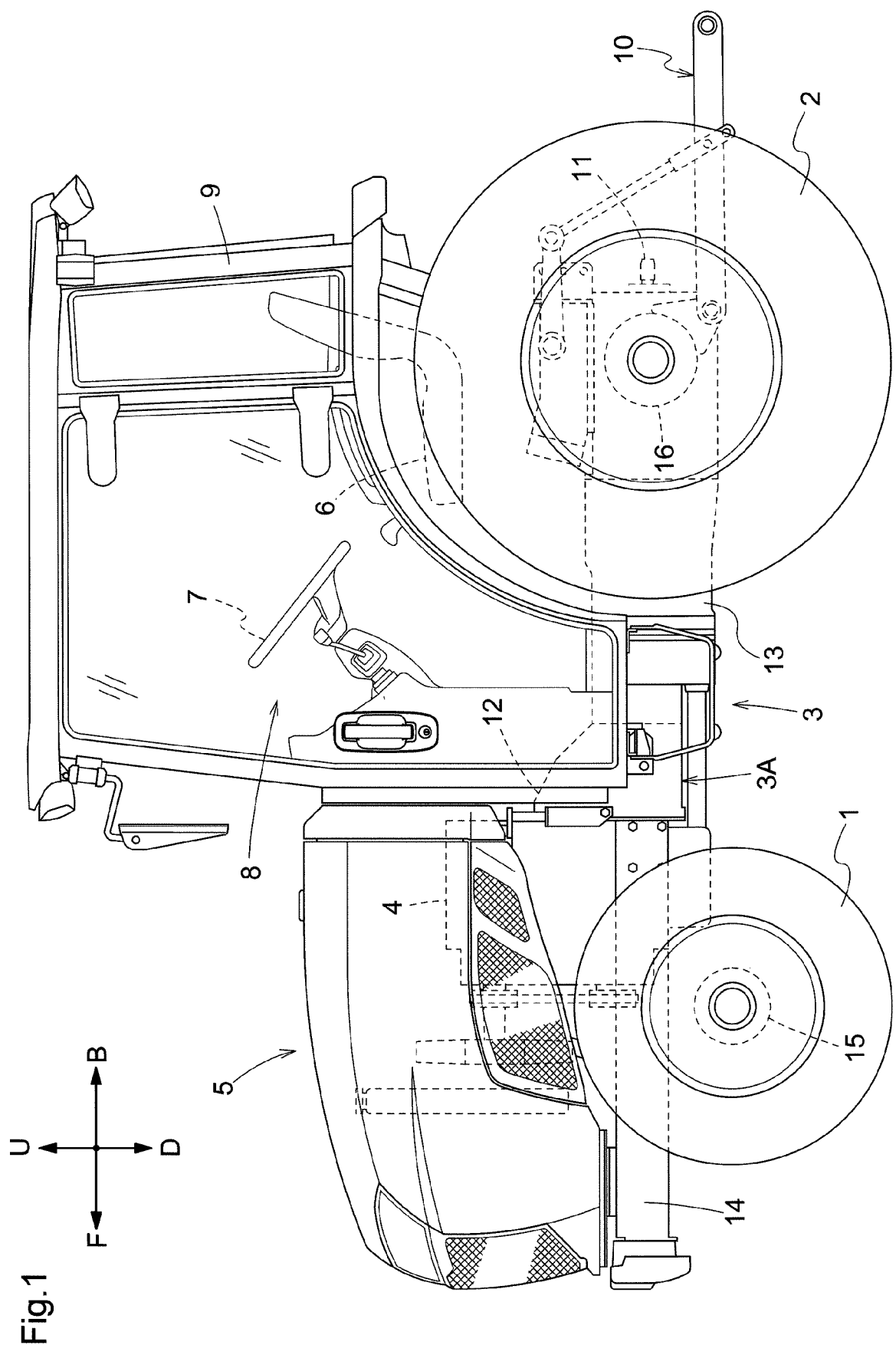
FIG. 1 is a left side view showing a tractor entirely.

Incidentally, in the following explanation, in relation to a vehicle body of a tractor, a direction of an arrow F shown in FIG. 1 is defined as "vehicle body front side", a direction of arrow B is defined as "vehicle body rear side", a direction of arrow U shown in FIG. 1 is defined as "vehicle body upper side", a direction of arrow D is defined as "vehicle body lower side", a direction on the near side of the illustration is defined as "vehicle body left side" and a direction on the far side of the illustration is defined as "vehicle body right side", respectively.

General Configuration of Tractor

As shown in FIG. 1, a tractor includes a vehicle body 3 mounting a pair of left and right front wheels 1 which are steerable and drivable and a pair of left and right rear wheels 2 which are drivable. At a front portion of the vehicle body 3, there is formed an engine section 5 having an engine 4. At a rear portion of the vehicle body 3, there is formed a riding type driving section 8 having a driver's seat 6 and a steering wheel 7 for steering the front wheels 1. At the driving section 8, there is provided a cabin 9 which covers a riding space. At the rear portion of the vehicle body 3, there are provided a link mechanism 10 for liftably coupling various kinds of implements such as a rotary plow (not shown) and a PTO shaft 11 for transmitting power of the engine 4 to a coupled implement.

A vehicle body frame 3A included in the vehicle body 3, as shown in FIG. 1, includes a clutch housing 12 having its front portion coupled to a rear portion of the engine 4, a transmission case 13 having its front portion coupled to a rear portion of the clutch housing 12 and a front wheel supporting frame 14 coupled to a lower portion of the engine 4. The left and right front wheels 1 are rotatably supported to side end portions of a front wheel driving case 15 extending in a vehicle body lateral width direction and supported to the front wheel supporting frame 14. The left and right rear wheels 2 are rotatably supported to a rear wheel supporting case 16 extended from a rear portion of the transmission case 13 toward the vehicle body lateral outer side.

Arrangement of Traveling Transmission Device

Figure 2:
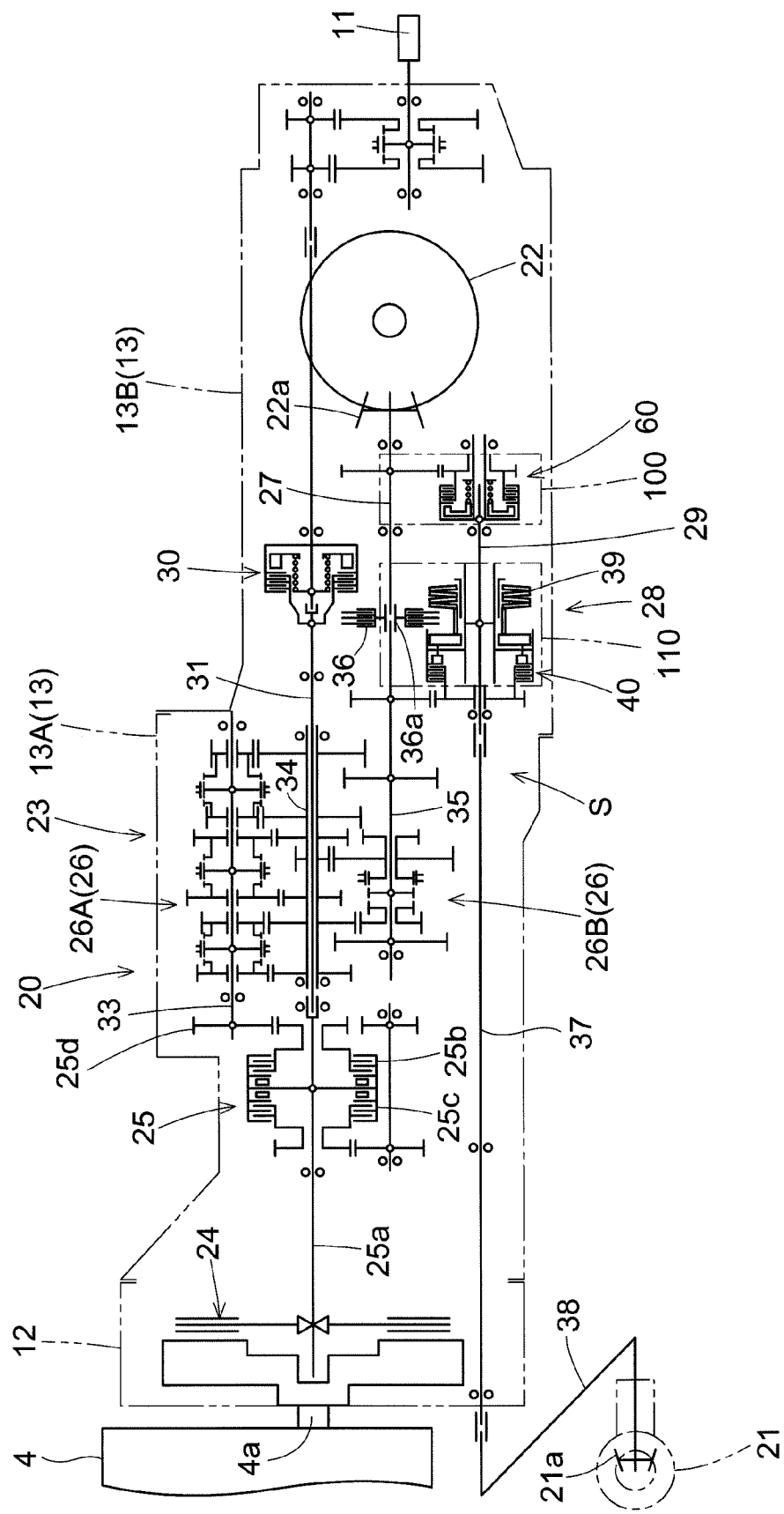
FIG. 2 is a diagram showing a traveling transmission device.

A traveling transmission device 20 configured to transmit power of the engine 4 to the front wheels 1 and the rear wheels 2 is configured and arranged as shown in FIG. 2.

This traveling transmission device 20, as shown in FIG. 2, includes a front wheel differential mechanism 21 for transmitting power to the left and right front wheels 1 (see FIG. 1), a rear wheel differential mechanism 22 for transmitting power of the engine to the left and right rear wheels 2 (see FIG. 1), and a transmission 23 configured to input the power of the engine 4 as a power source and to speed-change and transmit this inputted power to the front wheel differential mechanism 21 and the rear wheel differential mechanism 22. The front wheel differential mechanism 21 is provided inside a front wheel driving case 15 (see FIG. 1). The rear wheel differential mechanism 22 is accommodated at a rear portion of the transmission case 13.

The transmission 23, as shown in FIG. 2, is accommodated in the transmission case 13. The transmission case 13 includes a front case portion 13A having its front portion detachably attached to a rear portion of the clutch housing 12 accommodating a main clutch 24 and accommodating a forward/reverse switching device 25, etc., and a rear case portion 13B having its front portion detachably attached to a rear portion of the front case portion 13A and accommodating the rear wheel differential mechanism 22, etc.

The transmission 23, as shown in FIG. 2, includes the forward/reverse switching device 25 configured to input power of an output shaft 4a of the engine 4 via the main clutch 24 and to convert the inputted power to a forward traveling power and a reverse traveling power, a speed changing device 26 configured to speed-change the forward traveling power and the reverse traveling power outputted from the forward/reverse switching device 25, a rear wheel transmission shaft 27 for transmitting the forward traveling power and the reverse traveling power outputted from the speed changing device 26 to the rear wheel differential mechanism 22, a front wheel transmission device 28 inputting the forward traveling power and the reverse traveling power outputted from the speed changing device 26, and a front wheel transmission shaft 29 for transmitting forward traveling power and reverse traveling power outputted from the front wheel transmission device 28 to the front wheel differential mechanism 21. A numeral 30 shown in FIG. 2 denotes an implement clutch. This implement clutch 30, when switched to an engaged state, transmits power of a relay shaft 31 operably coupled to an input shaft 25a of the forward/reverse switching device 25 to the PTO shaft 11 and, when switched to a disengaged state, disconnects power transmission to the PTO shaft 11.

The forward/reverse switching device 25, as shown in FIG. 2, includes the input shaft 25a operably coupled to the output shaft 4a of the engine 4 via the main clutch 24 and a forward clutch 25b and a reverse clutch 25c mounted on the input shaft 25a. The forward clutch 25b and the reverse clutch 25c are constituted of wet type and hydraulic operation multiple-plate clutches.

In the forward-reverse switching device 25, if the forward clutch 25b is switched to an engaged state and the reverse clutch 25c is switched to a disengaged state, power of the engine 4 is converted into forward traveling power and outputted as such from an output gear 25d. In the forward-reverse switching device 25, if the forward clutch 25b is switched to a disengaged state and the reverse clutch 25c is switched to an engaged state, power of the engine 4 is converted into reverse traveling power and outputted as such from the output gear 25d.

The speed changing device 26, as shown in FIG. 2, includes an input shaft 33 inputting power from the output gear 25d of the forward/reverse switching device 25, an intermediate shaft 34 rotatably fitted on a relay shaft 31, an output shaft 35 provided downwardly of the intermediate shaft 34, a main speed changing portion 26A provided between the input shaft 33 and the intermediate shaft 34 and an auxiliary speed changing section 26B provided between the intermediate shaft 34 and the output shaft 35.

In the speed changing device 26, the power of the input shaft 33 is subjected to a main speed changing operation by the main speed changing portion 26A to be speed-changed in six steps of speed changed power from a first speed to a sixth speed, and the speed-changed power after the main speed changing operation is subjected to an auxiliary speed changing operation by the auxiliary speed changing portion 6B to be speed-changed in two steps of a high speed and a low speed and the speed changed power after the auxiliary speed changing operation is outputted from the output shaft 35.

Figure 3:
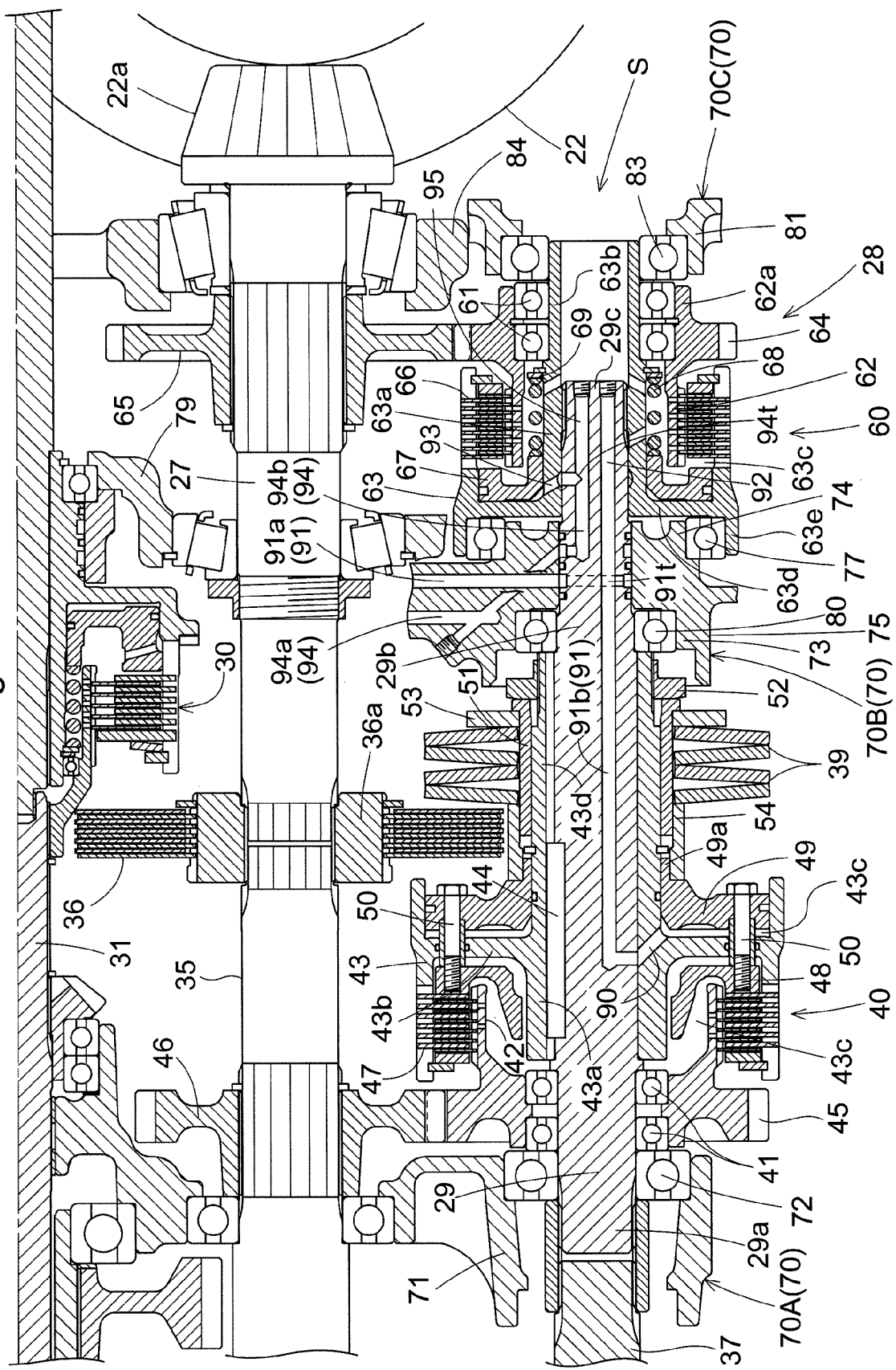
FIG. 3 is a side view in vertical section showing a front wheel transmission device.

As shown in FIG. 2 and FIG. 3, the rear wheel transmission shaft 27 is provided upwardly of the front wheel transmission shaft 29 and also in parallel with this front wheel transmission shaft 29. The rear wheel transmission shaft 27 is provided rearwardly of the output shaft 35 of the speed changing device 26 and disposed side by side in a straight line with the output shaft 35. An emergency brake 36 is provided between a rear end portion of the output shaft 35 of the speed changing device 26 and a front end portion of the rear wheel transmission shaft 27. A front wheel clutch 40 is mounted on the front wheel transmission shaft 29 and rearwardly of the front wheel clutch 40, a plurality of disc springs 39 are provided on the front wheel transmission shaft 29. The emergency brake 36 is provided with its outer circumferential portion being interposed between the front wheel clutch 40 and the disc springs 39. The output shaft 35 and the rear wheel transmission shaft 27, as shown in FIG. 3, are non-rotatably coupled to each other by a rotational member 36a of the emergency brake 36. The rotational member 36a supports a friction plate and is operably coupled to the output shaft 35 and the rear wheel transmission shaft 27 respectively via spline engagements. At a rear end portion of the rear wheel transmission shaft 27, an input gear 22a of the rear wheel differential mechanism 22 is non-rotatably provided. Forward traveling power and reverse traveling power of the output shaft 35 of the speed changing device 26 are transmitted via the rotational member 36a to the rear wheel transmission shaft 27. Then, the rear wheel transmission shaft 27 transmits the forward traveling power and the reverse traveling power transmitted thereto with keeping the same speed to the rear wheel differential mechanism 22. The emergency brake 36 is constituted of a multiple-plate type friction brake. The emergency brake 36 is used e.g. at time of engine stop, etc. The emergency brake 36, when switched to the engaged state, applies braking forces to the left and right rear wheels 2 via the rear wheel transmission shaft 27 and the rear wheel differential mechanism 22 and provides also braking forces to the left and right front wheels 1 via the output shaft 35, the front wheel transmission device 28, the front wheel transmission shaft 29, the front wheel output shaft 37, a rotational shaft 38 and the front wheel differential mechanism 21.

As shown in FIGS. 2 and 3, an output portion of the front wheel transmission device 28 is provided on the front wheel transmission shaft 29. To the front end portion of the front wheel transmission shaft 29, the rear end portion of the front wheel output shaft 37 is non-rotatably coupled. And, the front end portion of the front wheel output shaft 37 and the input gear 21a of the front wheel differential mechanism 21 are operably coupled to each other via the rotational shaft 38. The forward traveling power and the reverse traveling power outputted by the front wheel transmission device 28 are inputted to the front wheel transmission shaft 29. Then, the front wheel transmission shaft 29 transmits the forward traveling power and the reverse traveling power transmitted thereto to the front wheel differential mechanism 21 via the front wheel output shaft 37 and the rotational shaft 38.

Arrangement of Front Wheel Transmission Device

The front wheel transmission device 28, as shown in FIG. 3, includes the front wheel clutch 40 and a front wheel acceleration clutch 60 which are supported to the front wheel transmission shaft 29 side by side along the axis direction of this front wheel transmission shaft 29. In this particular embodiment, the front wheel clutch 40 is disposed forwardly of the front wheel acceleration clutch 60. However, the front wheel clutch 40 may be disposed rearwardly of the front wheel acceleration clutch 60.

The front wheel clutch 40, as shown in FIG. 3, includes a clutch hub 42 which is non-rotatably fitted on the front wheel transmission shaft 29 via a bearing 41 and a clutch drum 43 which is non-rotatably fitted on the front wheel transmission shaft 29. A boss portion 43a of the clutch drum 43 is engaged on the front wheel transmission shaft 29 and the boss portion 43a and the front wheel transmission shaft 29 are non-rotatably coupled to each other via a key 44. The clutch drum 43 is non-rotatably mounted on the front wheel transmission shaft 29.

The clutch hub 42 includes an equal-speed input gear 45 which is non-rotatably fitted to a front portion of the clutch hub 42. The equal-speed input gear 45 is meshed with an equal-speed transmission gear 46 which is non-rotatably mounted on the output shaft 35 of the speed changing device 26. The transmission ratio between the equal-speed input gear 45 and the equal-speed transmission gear 46 is set to such a transmission ratio which renders the rotational speed of the output shaft 35 and the rotational speed of the front wheel transmission shaft 29 equal to each other.

Inside the clutch drum 43, there are provided a pair of inside spaces 43c which are partitioned from each other by a rim portion 43b and disposed side by side in the front/rear direction. In the front inside space 43c of the pair of inside spaces 43c, there are provided a plurality of clutch plates 47 between the clutch hub 42 and the clutch drum 43. In the front inside space 43c, a pushing member 48 for pushing the clutch plate 47 is provided slidably. In the rear inside space 43c of the pair of inside spaces 43c, a first hydraulic piston 49 is mounted slidably. The first hydraulic piston 49 and the pushing member 48 are operably coupled to each other via a plurality of coupling members 50 extended forwardly from a plurality of positions in the circumferential direction of the first hydraulic piston 49. The plurality of coupling members 50 slidably extend through the rim portion 43b. The front wheel clutch 40 is constituted as a so-called wet type and hydraulic multiple-plate clutch.

A plurality of disc springs 39 as a "first urging member" are fitted on the front wheel transmission shaft 29 in juxtaposition in the axis direction of the front wheel transmission shaft 29, between an intermediate holder 70B supporting the front wheel transmission shaft 29 rearwardly of the front wheel clutch 40 and this front wheel clutch 40. The disc springs 39 are configured to urge the front wheel clutch 40 to its engaged state.

Specifically, the fitting of the disc springs 39 on the front wheel transmission shaft 29 is implemented via an extension portion 43d of the clutch drum 43 rewards to its boss portion 43a and a supporting tube 51 interposed between this extension portion 43d and the disc spring 39. The supporting tube 51 is received and supported from its rear side by a stopper portion 52 formed in the extension portion 43d. The plurality of disc springs 39 are received and supported from the rear sides thereof by a stopper portion 53 formed at the rear portion of the supporting tube 51.

Between a rear portion 49a of the first hydraulic piston 49 and a front portion of the supporting tube 51, there is fitted an urging force transmitting member 54 having a tubular shape. This urging force transmitting member 54 is slidably fitted to the supporting tube 51. The front end portion of the urging force transmitting member 54 is engaged with a stepped portion formed in the rear portion 49a of the first hydraulic piston 49 by coming into contact therewith from the rear side. The rear end portion of the urging force transmitting member 54 is engaged with the disc spring 39 which is located most forwardly among the plurality of disc springs 39, by coming contact therewith from the front side thereof. In operation, as the disc springs 39 with their elastic resilience push the urging force transmitting member 54 against the first hydraulic piston 49 and the urging force transmitting member 54 pushes the first hydraulic piston 49 against the rim portion 43b, the elastic resilience force of the disc springs 39 is transmitted via the urging force transmitting member 54 to the first hydraulic piston 49 and the first hydraulic piston 49 is urged to the engaged position by the disc springs 39.

The front wheel clutch 40 is switched over between the disengaged state and the engaged state by the first hydraulic piston 49 and the disc springs 39.

More particularly, in association with supply of pressure oil between the first hydraulic piston 49 and the rim portion 43b, the supplied pressure oil operates the first hydraulic piston 49 to the disengaged state against the urging force of the disc springs 39 and the pushing member 48 is slidably operated toward the rim portion 43b by the first hydraulic piston 49 and the pressed contact of the clutch plate 47 by the pushing member 48 is released to release the operable coupling between the clutch drum 43 and the clutch hub 42 by the clutch plate 47, whereby the front wheel clutch 40 is switched to the disengaged state.

With the switchover of the front wheel clutch 40 to the disengaged state, the power transmission from the equal-speed transmission gear 46 to the front wheel transmission shaft 29 is disconnected by the front wheel clutch 40. Namely, the front wheel clutch 40, when switched to the disengaged state, disconnects the transmission of the forward traveling power and the reverse traveling power outputted by the speed changing device 26 to the front wheel transmission shaft 29, thereby to disconnect the power transmission to the front wheel differential mechanism 21.

Conversely, in association with discharge of the pressure oil from between the first hydraulic piston 49 and the rim portion 43b, the first hydraulic piston 49 is operated to the engaged position by the urging force of the disc springs 39, whereby the pushing member 48 is slid toward the clutch plate 47 by the first hydraulic piston 49 and the clutch plate 47 is contacted and pressed by the pushing member 48, and the operative coupling is established by the clutch plate 47 between the clutch drum 43 and the clutch hub 42, thus, the front wheel clutch 40 is switched to the engaged state.

With the switchover of the front wheel clutch 40 to the engaged state, the power transmitted from the output shaft 35 of the speed changing device 26 to the equal-speed transmission gear 46 is transmitted via this front wheel clutch 40 to the front wheel transmission shaft 29 and then transmitted from this front wheel transmission shaft 29 to the front wheel differential mechanism 21. In this case, due to the transmission ratio set between the equal-speed transmission gear 46 and the equal-speed input gear 45, the rotational speed of the output shaft 35 and the rotational speed of the front wheel transmission shaft 29 are rendered equal to each other. As the power of the output shaft 35 is transmitted with keeping its rotational speed to the rear wheel transmission shaft 27, the front wheel clutch 40, when switched to the engaged state, effects the power transmission to the front wheel transmission shaft 29 in such a manner that an average circumferential speed of the left and right front wheels 1 is set equal to an average circumferential speed of the left and right rear wheels 2.

The front wheel acceleration clutch 60, as shown in FIG. 3, includes a clutch hub 62 rotatably supported on the front wheel transmission shaft 29 via a bearing 61 and a clutch drum 63 non-rotatably supported on the front wheel transmission shaft 29. Supporting of the clutch hub 62 to the front wheel transmission shaft 29 is provided by engagement of a boss portion 62a of the clutch hub 62 on an extension portion 63b rearwards to the boss portion 63a of the clutch drum 63 and interposing of the bearing 61 between the extension portion 63b and the boss portion 62a.

The clutch hub 62 includes an acceleration input gear 64 non-rotatably fitted to a rear portion of the clutch hub 62. The acceleration input gear 64 is meshed with an acceleration transmission gear 65 non-rotatably mounted on the rear wheel transmission shaft 27. The transmission ratio between the acceleration input gear 64 and the acceleration transmission gear 65 is set as such a transmission ratio which renders the rotational speed of the front wheel transmission shaft 29 higher than the rotational speed of the rear wheel transmission shaft 27.

In an inside space 63c of the clutch drum 63, a plurality of clutch plates 66 are provided between the clutch hub 62 and the clutch drum 63. In the inside space 63c, a second hydraulic piston 67 is slidably mounted. In the inside space 63c, there is provided a coil spring 68 as an "second urging member". The coil spring 68 is interposed between an end portion of the second hydraulic piston 67 and a stopper portion 69 formed in the boss portion 63a. The coil spring 68 urges the second hydraulic piston 67 to its disengaged position and urges the front wheel acceleration clutch 60 to its disengaged state. The front wheel acceleration clutch 60 is configured as a so-called wet type hydraulic multiple-plate clutch.

The front wheel acceleration clutch 60 is switched over between the engaged state and the disengaged state, by the second hydraulic piston 67 and the coil spring 68.

More particularly, in association with supply of pressure oil between the second hydraulic piston 67 and the rim portion 63d of the clutch drum 63, the supplied pressure oil operates the second hydraulic piston 67 to its engaged position against the coil spring 68, and the clutch plate 66 is contacted and pressed by the second hydraulic piston 67, thus establishing operable coupling between the clutch drum 63 and the clutch hub 62 via the clutch plate 66, and the front wheel acceleration clutch 60 is switched to the engaged state.

With the switchover of the front wheel acceleration clutch 60 to the engage state, the power transmitted from the output shaft 35 of the speed changing device 26 via the rear wheel transmission shaft 27 to the acceleration transmission gear 65 is transmitted via the front wheel acceleration clutch 60 to the front wheel transmission shaft 29 and then transmitted from this front wheel transmission shaft 29 to the front wheel differential mechanism 21. In this case, due to the transmission ratio set between the acceleration transmission gear 65 and the acceleration input gear 64, the rotational speed of the front wheel transmission shaft 29 is set higher than the rotational speed of the output shaft 35. As the power of the output shaft 35 is transmitted as it is, i.e. with keeping the same rotational speed, to the rear wheel transmission shaft 27, the front wheel acceleration clutch 60, when switched to the engaged state, effects power transmission to the front wheel transmission shaft 29 in such a manner that the average circumferential speed of the left and right front wheels 1 is rendered higher than the average circumferential speed of the left and right rear wheels 2.

Conversely, in association with discharge of the pressure oil from between the second hydraulic piston 67 and the rim portion 63d of the clutch drum 63, the second hydraulic piston 67 is operated to the disengaged position by the urging force of the coil spring 68, so that the pressed contact of the clutch plate 66 by the second hydraulic piston 67 is released, whereby the operative coupling between the clutch drum 63 and the clutch hub 62 by the clutch plate 66 is released and the front wheel acceleration clutch 60 is switched to the disengaged state.

With the switchover of the front wheel acceleration clutch 60 to the disengaged state, the power transmission from the acceleration transmission gear 65 to the front wheel transmission shaft 29 is disconnected by the front wheel acceleration clutch 60. The front wheel acceleration clutch 60, when switched to the disengaged state, disconnects the transmission of the forward traveling power and the reverse traveling power outputted by the speed changing device 26 to the front wheel transmission shaft 29, thus disconnecting the power transmission to the front wheel differential mechanism 21.

If the front wheel clutch 40 is switched to the disengaged state and the front wheel acceleration clutch 60 is also switched to the disengaged state, the power transmission from the equal-speed transmission gear 46 to the front wheel transmission shaft 29 is disconnected by the front wheel clutch 40 and the power transmission from the acceleration transmission gear 65 to the front wheel transmission shaft 29 is disconnected by the front wheel acceleration clutch 60, and the power transmission to the front wheel differential mechanism 21 is disconnected. Irrespectively of the engaged or disengaged states of the front wheel clutch 40 and the front wheel acceleration clutch 60, the power of the output shaft 35 of the speed changing device 26 is transmitted via the rear wheel transmission shaft 27 to the rear wheel differential mechanism 22. With this, there is realized a two-wheel drive state in which the front wheels 1 are stopped and become freely rotatable and the rear wheels 2 are driven.

If the front wheel clutch 40 is switched to the engaged state and the front wheel acceleration clutch 60 is switched to the disengaged state, the power of the output shaft 35 of the speed changing device 26 is transmitted as it is, i.e. with keeping the same speed, to the front wheel transmission shaft 29 by the equal-speed transmission gear 46 and the front wheel clutch 40 and then transmitted from the front wheel transmissions shaft 29 to the front wheel differential mechanism 21 and the power transmission from the acceleration transmission gear 65 to the front wheel transmission shaft 29 is disconnected by the front wheel acceleration clutch 60. The power of the output shaft 35 of the speed changing device 26 is transmitted as it is, i.e. with keeping the same speed, to the rear wheel differential mechanism 22 via the rear wheel transmission shaft 27. With this there is provided a front/rear equal-speed four-wheel drive state in which the front wheels 1 and the rear wheels 2 are driven and also the average circumferential speed of the left and right front wheels 1 is rendered equal to the average circumferential speed of the left and right rear wheels 2.

If the front wheel clutch 40 is switched to the disengaged state and the front wheel acceleration clutch 60 is switched to the engaged state, the power transmission from the equal-speed transmission gear 46 to the front wheel transmission shaft 29 is disconnected by the front wheel clutch 40 and the power transmitted from the output shaft 35 of the speed changing device 26 to the rear wheel transmission shaft 27 is accelerated by the acceleration transmission gear 65 and the front wheel acceleration clutch 60 and transmitted as such to the front wheel transmission shaft 29 and then transmitted from this front wheel transmission shaft 29 to the front wheel differential mechanism 21. The power of the output shaft 35 of the speed changing device 26 is transmitted as it is, i.e. with the same speed, to the rear wheel differential mechanism 22 via the rear wheel transmission shaft 27. With this, there is realized a front-wheel accelerated four-wheel drive state in which the front wheels 1 and the rear wheels 2 are driven and the average circumferential speed of the left and right front wheels 1 is rendered higher than the average circumferential speed of the left and right rear wheels 2.

When the pressure oil supply to the first hydraulic piston 49 and the second hydraulic piston 67 is stopped as in the case of stopping of the engine 4 resulting in stopping of a hydraulic pump (not shown), even if the front wheel acceleration clutch 60 is switched to the disengaged state by the coil spring 68, the front wheel clutch 40 will be switched to the engaged state by the disc springs 39, so that operative coupling will be established between the equal-speed transmission gear 46 and the front wheel transmission shaft 29 via the front wheel clutch 40, and the front wheels 1 will not be rendered into the free rotation state, and also the braking force of the emergency brake 36 can be applied to the front wheels 1 via the front wheel clutch 40, the front wheel transmission shaft 29, etc. Moreover, the front wheel clutch 40 can be firmly maintained under the engaged state by the strong urging force of the disc springs 39 so that he front wheel clutch 40 will not slip by the operational force applied from the front wheels 1 to the front wheel clutch 40. Thus, even in a sloped land, the vehicle body can be firmly braked.

Supporting of Front Wheel Transmission Shaft

The supporting of the front wheel transmission shaft 29, as shown in FIG. 3, is provided by holders 70 which respectively support three portions of the front wheel transmission shaft 29 in the axis direction. In the following discussion, of the holders 70 provided at the three positions, the holder 70 located at the most front side will be referred to as a front holder 70A. Further, of the holders 70 provided at the three positions, the holder 70 located at the most rear side (constituting "a second holder" in the claims) will be referred to as a rear holder 70C. And, of the holders 70 provided at the three positions, the holder 70 located between the front holder 70A and the rear holder 70C will be referred to as an intermediate holder 70B.

The front holder 70A is constituted of a wall portion of the transmission case 13 disposed in the inside space S of the transmission case 13. The front holder 70A includes a boss portion 71 through which the front wheel transmission shaft 29 extends. Of the front wheel transmission shaft 29, a portion 29a thereof located forwardly of the front wheel clutch 40 is rotatably supported via a bearing 72 to the boss portion 71 of the front holder 70A.

Figure 4:
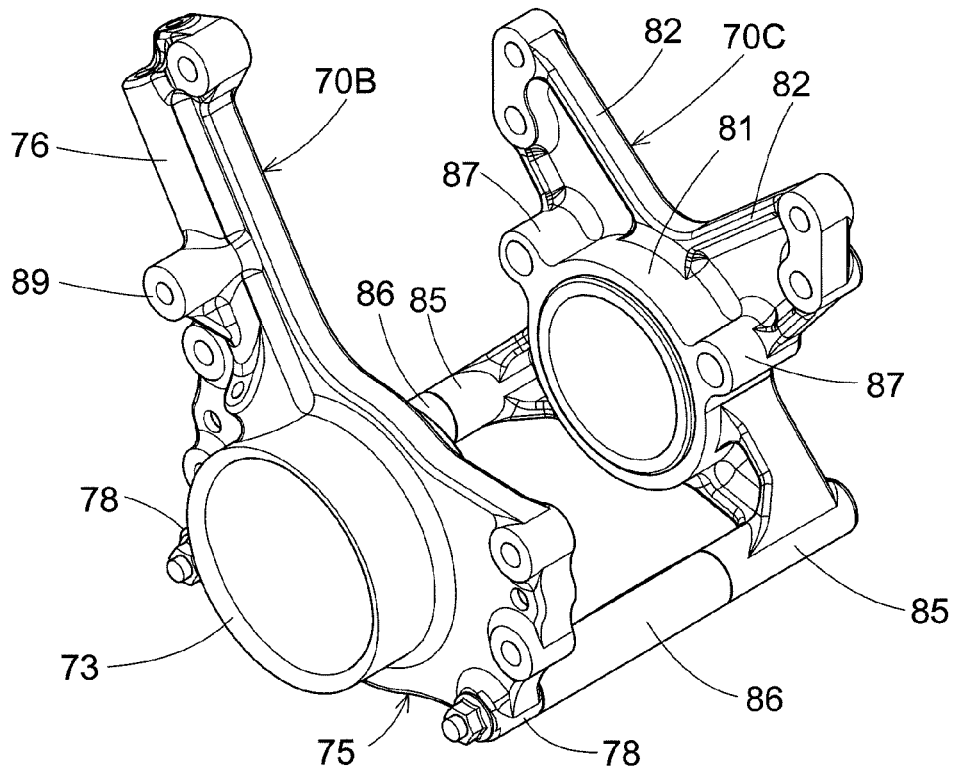
FIG. 4 is a perspective view showing a holder, a second holder and a spacer.

The intermediate holder 70B, as shown in FIG. 4, is formed separately of the transmission case 13. The intermediate holder 70B includes a boss portion 73 through which the front wheel transmission shaft 29 extends, a holder portion 75 having a supporting portion 74 protruding rearwards from the boss portion 73 and a coupling arm portion 76 extended upwards from the holder portion 75. The supporting portion 74, as shown in FIG. 3, is configured to be engaged within an annular portion 63e formed at a front portion of the clutch drum 63 as a rotational member of the front wheel acceleration clutch 60. Between the supporting portion 74 and the annular portion 63e, the bearing 77 is interposed.

Figure 5:
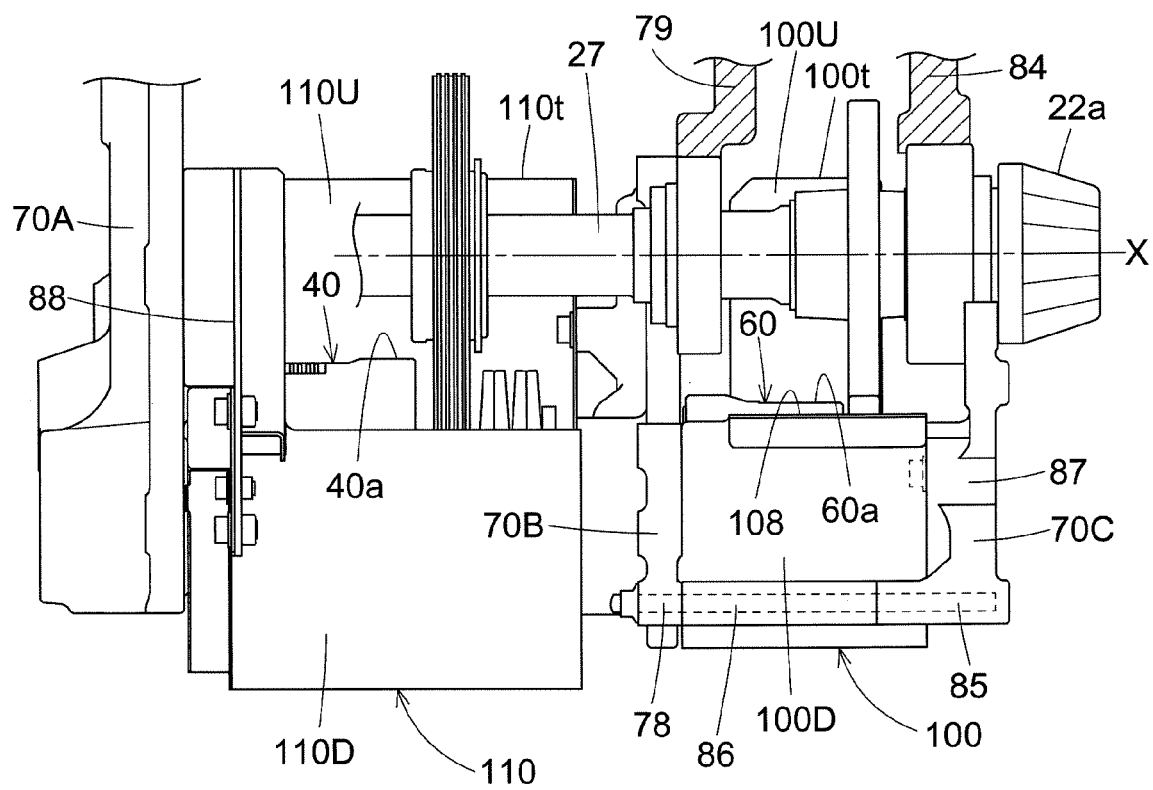
FIG. 5 is a left side view showing an acceleration clutch cover and a front wheel clutch cover.
Figure 6:
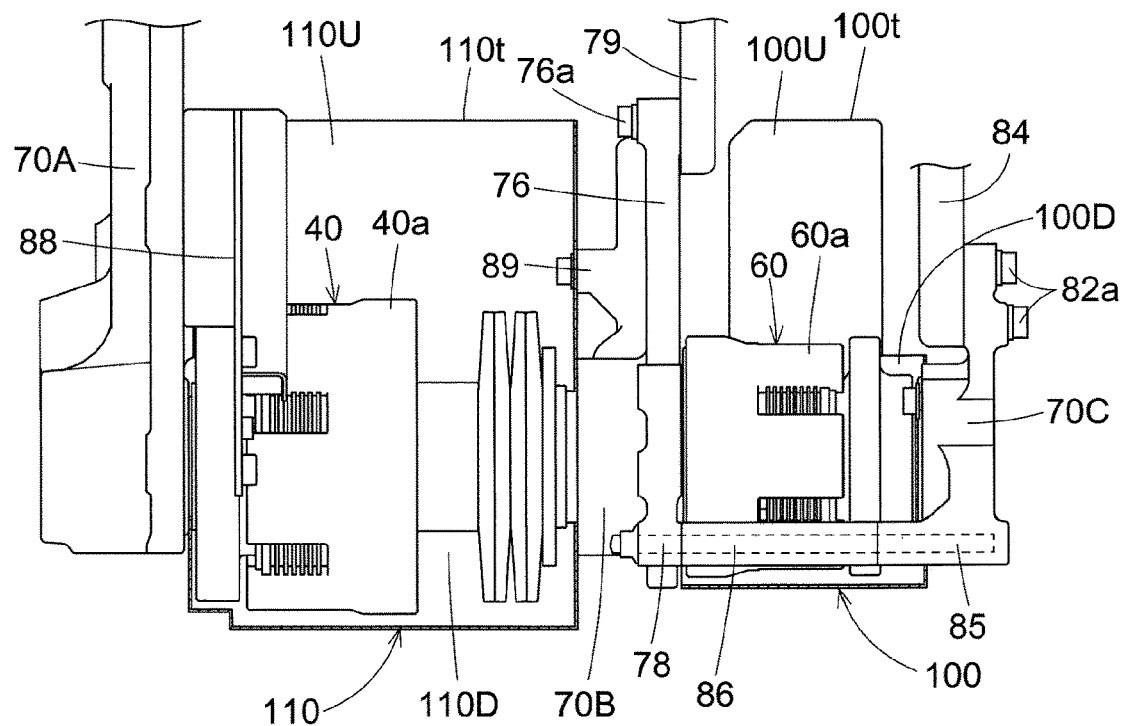
FIG. 6 is a side view in vertical section showing the acceleration clutch cover and the front wheel clutch cover.

As shown in FIG. 5 and FIG. 6, of the holder portion 75 and the coupling arm portion 76, the coupling arm portion 76 alone is detachably coupled via a coupling bolt 76a by being placed in abutment against the wall portion 79 provided in the inside space S of the transmission case 13. The intermediate holder 70B, as being located at a position where the holder portion 75 is away from the wall portion 79, is supported to the wall portion 79. Of the front wheel transmission shaft 29, a portion 29b thereof located between the front wheel clutch 40 and the front wheel acceleration clutch 60, is rotatably supported via a bearing 80 to the boss portion 73 of the intermediate holder 70B. The clutch drum 63 of the front wheel acceleration clutch 60 is rotatably supported via a bearing 77 to the supporting portion 74 of the intermediate holder 70B.

The rear holder 70C, as shown in FIG. 4, is formed separately from the transmission case 13. The rear holder 70C includes a boss portion 81 and a pair of coupling arm portions 82 extended upwards from the boss portion 81. The boss portion 81, as shown in FIG. 3, is configured to be fittable via a bearing 83 to an extension portion 63b of the boss portion 63a of the clutch drum 63.

As shown in FIG. 3, in the inside space S of the transmission case 13, a further wall portion 84 different and separate from the wall portion 79 supporting the intermediate holder 70B is provided rearwardly of the wall portion 79. As shown in FIG. 5 and FIG. 6, of the coupling arm portions 82 and the boss portion 81, the coupling arm portions 82 alone are detachably coupled via a coupling bolt 82a by being placed in abutment against the wall portion 84. The rear holder 70C, as being located at a portion where the boss portion 81 is away from the wall portion 84, is supported to the wall portion 84. As shown in FIG. 3, the extension portion 63b of the boss portion 63a of the clutch drum 63 is rotatably supported via the bearing 83 to the boss portion 81. Namely, at the position opposite to the side where the front wheel clutch 40 is located, relative to the front wheel acceleration clutch 60, the front wheel transmission shaft 29 is rotatably supported via the boss portion 63a and the bearing 83 to the boss portion 81 of the rear holder 70C.

As shown in FIG. 4 and FIG. 6, at two portions of a holder portion 75 which is the portion of the intermediate holder 70B away from the wall portion 79, spacer coupling portions 78 are formed. At two portions of the boss portion 81 which are the portion of the rear holder 70C away from the wall portion 70C, spacer coupling portions 85 are formed. As shown in FIGS. 4, 5 and 6, spacers 86 are coupled to the spacer coupling portions 78 of the intermediate holder 70B and the spacer coupling portions 85 of the rear holder 70C. The portions of the intermediate holder 70B away from the wall portion 79 and the portions of the rear holder 70C away from the wall portion 84 are coupled to each other by the two spacers 86. The spacers 86 set appropriate spacing for positioning the front wheel acceleration clutch 60 between the intermediate holder 70B and the rear holder 70C. The intermediate holder 70B and the rear holder 70C reinforce each other with utilizing the spacers 86 as reinforcing members.

Operational Devices for Front Wheel Clutch and Front Wheel Acceleration Clutch

As shown in FIG. 3, in the boss portion 43a of the clutch drum 43 of the front wheel clutch 40, there is formed a first supply-discharge port 90 supplying and discharging pressure oil to/from between the rim portion 43b and the first hydraulic piston 49. The first supply-discharge port 90 and an operational valve (not shown) provided outside the transmission case 13 are connected to each other via a first operational oil passage 91 defined respectively in and between the front wheel transmission shaft 29 and the intermediate holder 70B. The first operational oil passage 91 includes a holder oil passage portion 91a defined in the intermediate holder 70B and a shaft oil passage portion 91b defined in the front wheel transmission shaft 29 from a portion thereof corresponding to the holder oil passage portion 91a and a portion thereof corresponding to the first supply-discharge port 90. In the front wheel transmission shaft 29, a shaft hole 92 formed between an intermediate side end portion 91t of the shaft oil passage portion 91b and the end portion 29c of the front wheel transmission shaft 29 does not form the first operational oil passage 91, but is provided for defining the shaft oil passage portion 91b.

When the operational valve is switched to the disengaged position, pressure oil is supplied from the operational valve to the first operational oil passage 91 and the first operational oil passage 91 feeds the supplied pressure oil via the first supply-discharge port 90 to between the rim portion 43b and the first hydraulic piston 49, thereby to operate the first hydraulic piston 49 to the disengaged position against the disc springs 39. In association with the switchover of the operational valve to the engaged position, the pressure oil present between the rim portion 43b and the first hydraulic piston 49 is returned via the first supply-discharge port 90 to the first operational oil passage 91 and the first operational oil passage 91 discharges the returned pressure oil, thereby to operate the first hydraulic piston 49 to the engaged position by the disc springs 39. Namely, the first operational oil passage 91 effects switchover of the front wheel clutch 40 between the engaged state and the disengaged state by supplying and discharging of pressure oil.

As shown in FIG. 3, in the boss portion 63a of the clutch drum 63 of the front wheel acceleration clutch 60, there is formed a second supply-discharge port 93 for supplying and discharging pressure oil to/from between the rim portion 63d and the second hydraulic piston 67. The second supply-discharge port 93 and an operational valve (not shown) provided outside the transmission case 13 are connected to each other via a second operational oil passage 94 defined respectively in and between the front wheel transmission shaft 29 and the intermediate holder 70B. The second operational oil passage 94 includes a holder oil passage portion 94a defined in the intermediate holder 70B and a shaft oil passage portion 94b defined in the front wheel transmission shaft 29 from a portion thereof corresponding to the holder oil passage portion 94a and a portion thereof corresponding to the second supply-discharge port 93. In the front wheel transmission shaft 29, a shaft hole 95 formed between an intermediate holder side end portion of the shaft oil passage portion 94b and the end portion 29c of the front wheel transmission shaft 29 does not form the second operational oil passage 94, but is provided for defining the shaft oil passage portion 94b.

When the operational valve is switched to the engaged position, pressure oil is supplied from the operational valve to the second operational oil passage 94 and the second operational oil passage 94 supplies the pressure oil via the second supply-discharge port 93 to between the rim portion 63d and the second hydraulic piston 67, thereby to operate the second hydraulic piston 67 to the engaged position against the coil spring 68. With switchover of the operational valve to the disengaged position, the pressure oil present between the rim portion 63d and the second hydraulic piston 67 is returned via the second supply-discharge port 93 to the second operational oil passage 94 and the second operational oil passage 94 discharges the returned pressure oil, thereby to operate the second hydraulic piston 67 to the disengaged position by the coil spring 68. Namely, the second operational oil passage 94 effects switchover of the front wheel acceleration clutch 60 between the engaged state and the disengaged state by supplying and discharging of pressure oil.

Arrangement of Acceleration Clutch Cover

Figure 8:
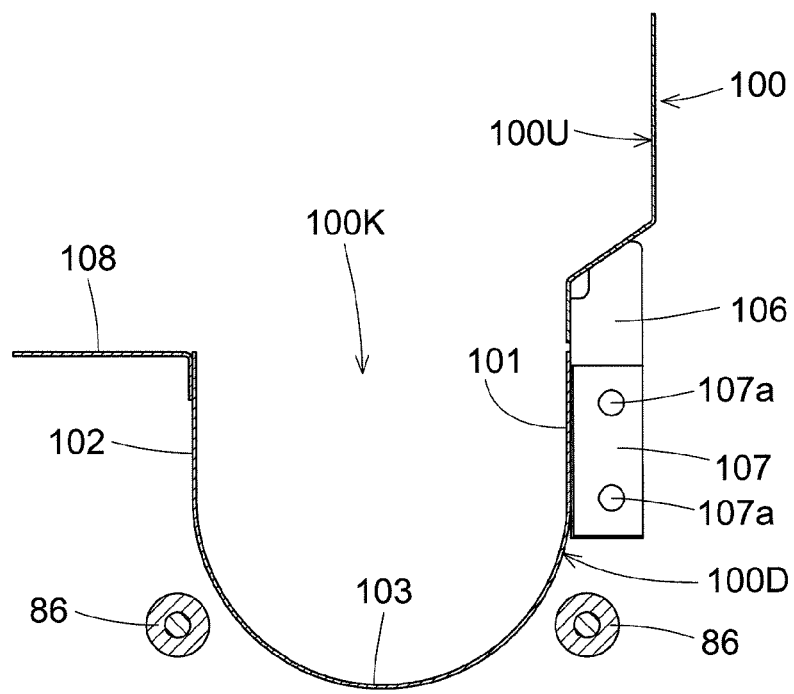
FIG. 8 is a rear view in vertical section showing the acceleration clutch cover and the spacer.
Figure 9:
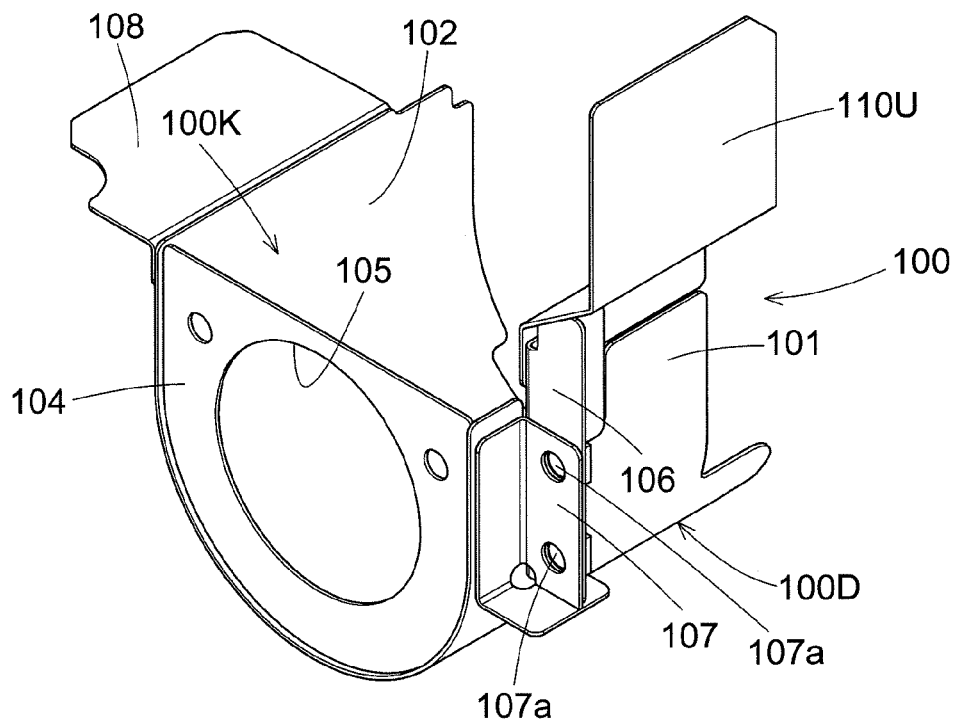
FIG. 9 is a perspective view showing the acceleration clutch cover.
Figure 10:
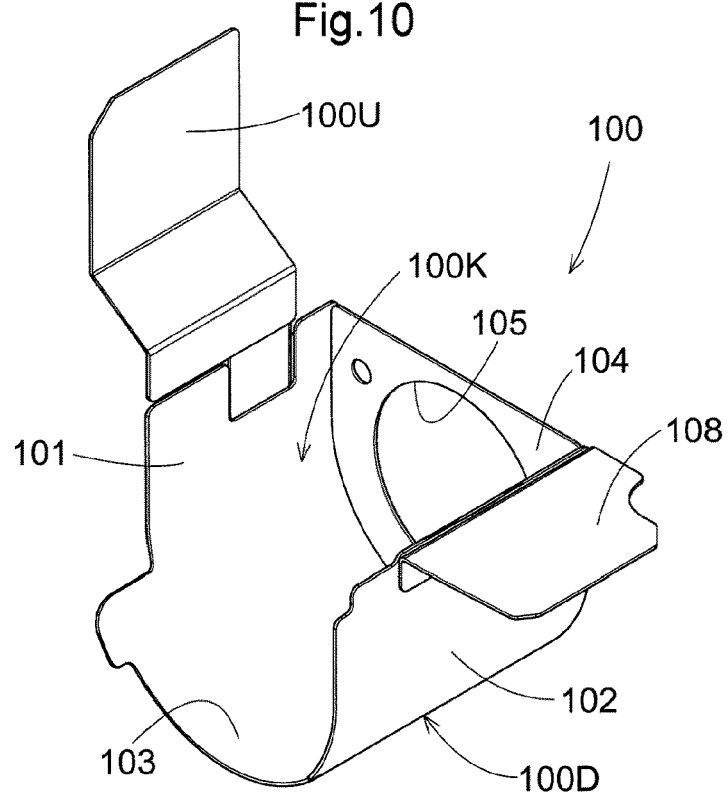
FIG. 10 is a perspective view showing the acceleration clutch cover.

As shown in FIG. 2, the front wheel acceleration clutch 60 is disposed downwardly of the inside space S of the transmission case 13. In the inside space S, there is provided an acceleration clutch cover 100 for covering the front wheel acceleration clutch 60. The acceleration clutch cover 100, as shown in FIGS. 8, 9 and 10, includes an upwardly formed opening 100K. Lubricant oil stored in the transmission case 13 flows via the opening 100K to the inside of the acceleration clutch cover 100 and the lubricant oil can be stored in the area of the inside space S around the front wheel acceleration clutch 60. The lubricant oil present in the area around the front wheel acceleration clutch 60 will be stirred by a rotational motion of the front wheel acceleration clutch 60, but the acceleration clutch cover 100 serves to suppress extension of the stirring of the lubricant oil by the front wheel acceleration clutch 60 to lubricant oil present in the area apart from the area around the front wheel acceleration clutch 60.

Specifically, the acceleration clutch cover 100, as shown in FIGS. 5 and 6, is disposed between the intermediate holder 70B and the rear holder 70C. A rear portion of the acceleration clutch cover 100 is coupled via a coupling bolt to the supporting portion 87 (see FIG. 4) formed in the rear holder 70C and the acceleration clutch cover 100 is detachably supported to the rear holder 70C. The acceleration clutch cover 100, as shown in FIGS. 5 and 6, includes a lower cover portion 100D positioned downwardly of the upper end portion 60a of the front wheel acceleration clutch 60 and an upper cover portion 100U extended upwards from the lower cover portion 100D.

Figure 7:
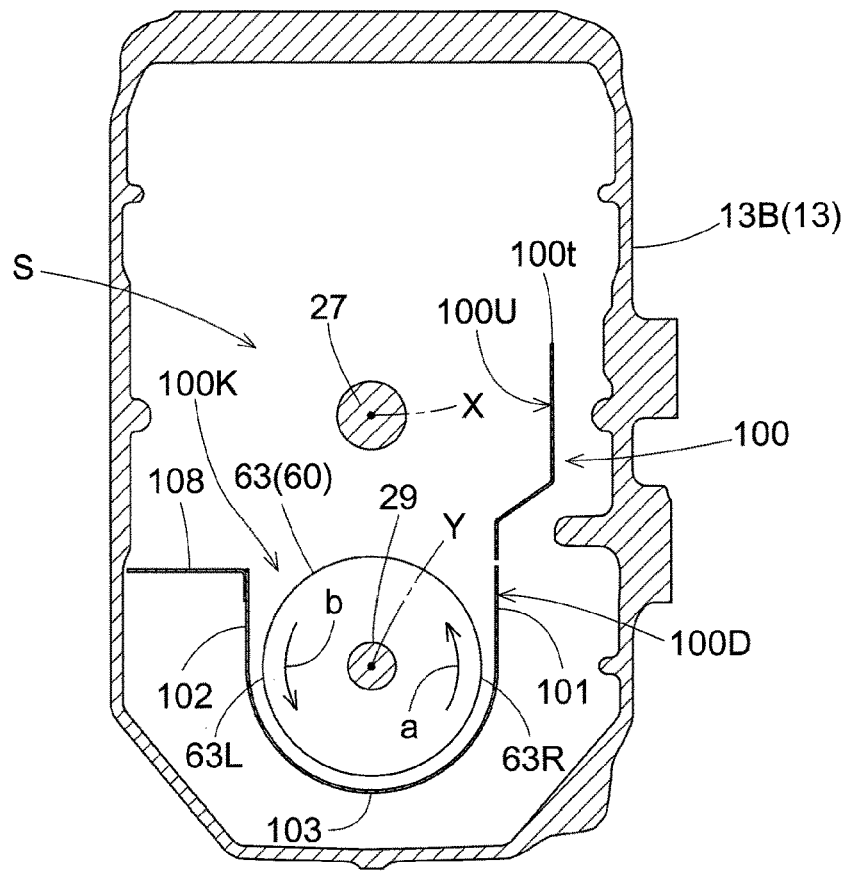
FIG. 7 is a rear view in vertical section showing the acceleration clutch cover.

The lower cover portion 100D, as shown in FIGS. 5, 6, 9 and 10, includes a first side wall portion 101 covering the front wheel acceleration clutch 60 from its right side, a second side wall portion 102 covering the front wheel acceleration clutch 60 from its left side, a bottom wall portion 103 covering the front wheel acceleration clutch 60 from its lower side and a rear wall portion 104 covering the front wheel acceleration clutch 60 from its rear side. From the upper end portion of the second side wall portion 102, a horizontally oriented cover portion 108 is extends to the horizontally outer side of the lower cover portion 100D. The horizontally oriented cover portion 108 is extended to the side wall portion of the transmission case 13 as shown in FIG. 7. The gap between the second side wall portion 102 and the transmission case 13 is closed by the horizontally oriented cover portion 108. The bottom wall portion 103 has an arcuate shape along the lower portion of the front wheel acceleration clutch 60. In the rear wall portion 104, there is defined a through hole 105 for receiving the boss portion 81 of the rear holder 70C. The upper cover portion 100U, as shown in FIGS. 5 and 7, is extended upwards from the first side wall portion 101 to a position higher than the axis X of the rear wheel transmission shaft 27. An upper end 100t of the upper cover portion 100U as the upper end of the acceleration clutch cover 100 is located at a position higher than the axis X of the rear wheel transmission shaft 27. As shown in FIGS. 8 and 9, the upper cover portion 100U is formed as a member separate from the lower cover portion 100D. A coupling portion 106 formed at a lower portion of the upper cover portion 100U and a supporting portion 107 formed in the first side wall portion 101 of the lower cover portion 100D are coupled with each other via fastening bolts (not shown) fitted in bolt holes 107a. The upper cover portion 100U and the lower cover portion 100D are detachably coupled to each other. To the lubricant oil stirred by a rotational motion of the front wheel acceleration clutch 60 in the area around the front wheel acceleration clutch 60, the acceleration clutch cover 100 provides a wave-preventing action, so that extension of the stirring by the front wheel acceleration clutch 60 to the lubricant oil present in the area apart from the area around the front wheel acceleration clutch 60 is suppressed.

The upper end 100t of the upper cover portion 100U as the upper end of the acceleration clutch cover 100 is located at the position higher than the axis X of the rear wheel transmission shaft 27. Storage of the lubricant in the transmission case 13 is done generally, with its oil surface being located at the position of the axis X of the rear wheel transmission shaft 27 or at a position higher than the axis X. However, extension of flowing of the lubricant oil caused by the stirring of the lubricant oil by the front wheel acceleration clutch 60 to the lubricant oil present in the area apart from the area around the front wheel acceleration clutch 60 is effectively prevented by the upper cover portion 100U.

As shown in FIGS. 7 and 8, the upper cover portion 100U is extended from only the first side wall portion 101 of the first side wall portion 101 and the second side wall portion 102. At the time of transmission of the forward traveling power, and as seen in the direction along a rotational axis Y of the clutch drum 63 of the front wheel acceleration clutch 60, a right side portion 63R of the clutch drum 63 rotates in the rising direction as indicated by an arrow (a) and a left side portion 63L of the clutch drum 63 rotates in a descending direction as indicated by an arrow (b). With this, the lubricant oil stirred by the right side portion 63R will flow upwards whereas the lubricant oil stirred by the left side portion 63L will flow downwards. The first side wall portion 101 of the lower cover portion 100D corresponds to the right side portion 63R of the clutch drum 63 and the second side wall portion 102 of the lower cover portion 100D corresponds to the left side portion 63L of the clutch drum 63. And, as the upper cover portion 100U is extended upwards from the first side wall portion 101 corresponding to the right side portion 63R causing the rising flow of the lubricant oil, the upper cover portion 100U provides an effective wave-preventing effect to the rising lubricant oil flow.

Arrangement of Front Wheel Cover

Figure 11:
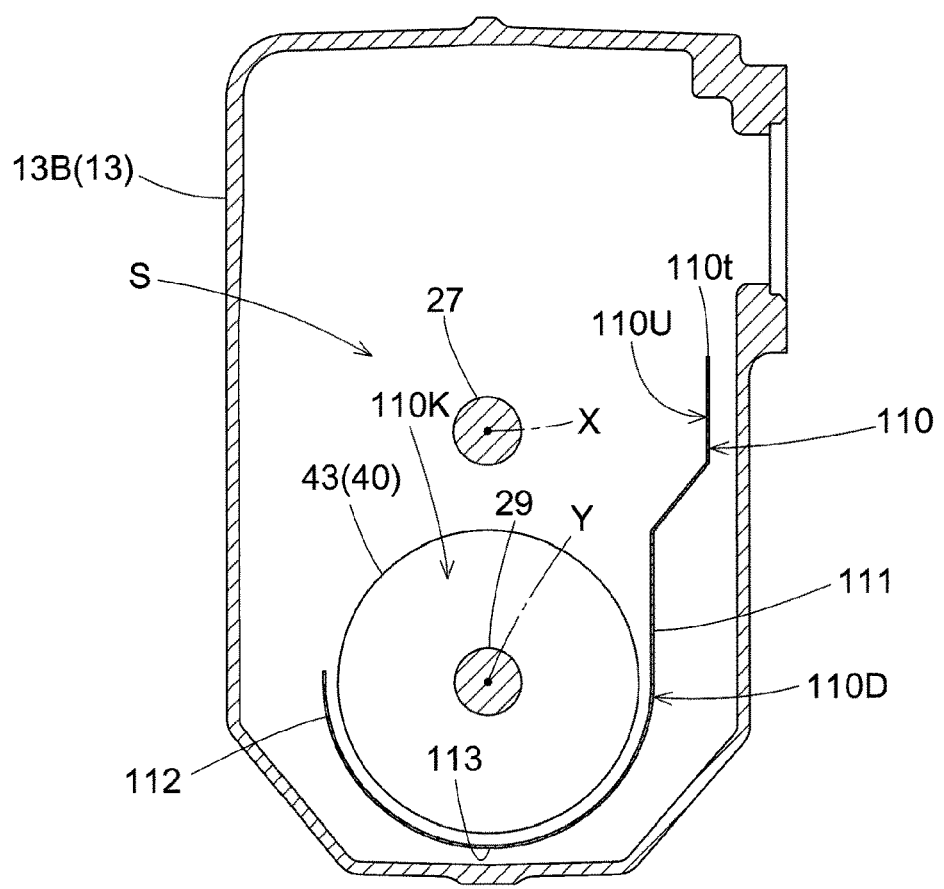
FIG. 11 is a rear view in vertical section showing the front wheel clutch cover.
Figure 12:
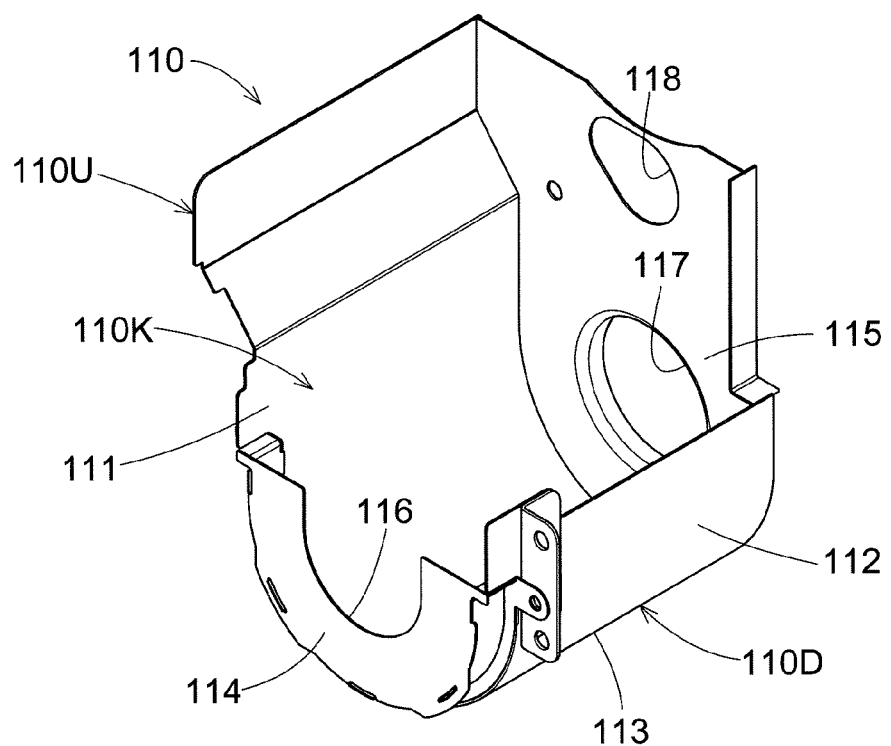
FIG. 12 is a perspective view showing the front wheel clutch cover.

As shown in FIG. 2, the front wheel clutch 40 is disposed downwardly of the inside space S of the transmission case 13. In the inside space S, there is provided a front wheel clutch cover 110 for covering the front wheel clutch 40. The front wheel clutch cover 110, as shown in FIGS. 11 and 12, includes an upwardly formed opening 110K. Lubricant oil stored in the transmission case 13 flows via the opening 110K to the inside of the front wheel clutch cover 110 and the lubricant oil can be stored in the area of the inside space S around the front wheel clutch 40. The lubricant oil preset in the area around the front wheel clutch 40 will be stirred by a rotational motion of the front wheel clutch 40, but the front wheel clutch cover 110 serves to suppress extension of the stirring of the lubricant oil by the front wheel clutch 40 to lubricant oil present in the area apart from the area around the front wheel clutch 40.

Specifically, the front wheel clutch cover 110, as shown in FIGS. 5 and 6, is disposed between the front holder 70A and the intermediate holder 70B. A front portion of the front wheel clutch cover 110 is coupled via a coupling bolt to the supporting portion 88 formed in the front holder 70A and a rear portion of the front wheel clutch cover 110 is coupled via a coupling bolt to the supporting portion 89 (see FIG. 4) formed in the intermediate holder 70B, the front wheel clutch cover 110 is detachably supported to the front holder 70A and the intermediate holder 70B.

The front wheel clutch cover 110, as shown in FIGS. 5, 6, 11 and 12, includes a lower cover portion 110D positioned downwardly of an upper end portion 40a of the front wheel clutch 40 and an upper cover portion 110U extended upwards from a first side wall portion 111 and a rear wall portion 115 of the lower cover portion 110D. The upper cover portion 110U is formed integrally with the first side wall portion 111 and the rear wall portion 115 of the lower cover portion 110D. The upper cover portion 110U is extended to a position higher than the axis X of the rear wheel transmission shaft 27. An upper end 110t of the upper cover portion 110U as the upper end of the front wheel clutch cover 110 is located at a position higher than the axis X.

The lower cover portion 110D, as shown in FIGS. 5, 6, 11 and 12, includes a first side wall portion 111 covering the front wheel clutch 40 from its right side, a second side wall portion 112 covering the front wheel clutch 40 from its left side, a bottom wall portion 113 covering the front wheel clutch 40 from its lower side and a rear wall portion 115 covering the front wheel clutch 40 from its rear side. The bottom wall portion 113 has an arcuate shape along the lower portion of the front wheel clutch 40. The front wall portion 114 is configured to be detachably attached to the portion of the lower cover portion 110D excluding the front cover portion. In the front wall portion 114, there is formed a cutout portion 116 through which the front wheel transmission shaft 29 is inserted. In the rear wall portion 115, there is formed a through hole 117 for receiving the boss portion 73 of the intermediate holder 70B. In the upper cover portion 110U, there is formed a through hole 118 through which the rear wheel transmission shaft 27 is inserted.

Other Embodiments (1) In the foregoing embodiment, there was disclosed an example arrangement in which the upper end 100t of the acceleration clutch cover 100 and the upper end 110t of the front wheel clutch cover 110 are located at positions higher than the axis X of the rear wheel transmission shaft 27. Alternatively, the upper end 100t of the acceleration clutch cover 100 and the upper end 110t of the front wheel clutch cover 110 may be located at positions as high as (at same height) the axis X.

(2) In the foregoing embodiment, there was disclosed an example arrangement in which as the supporting portion 74 of the intermediate holder 70B, the clutch drum 63 as the rotational member of the front wheel acceleration clutch 60 is supported. However, the clutch hub 62 may be supported as a rotational member. Further alternatively, the supporting portion 74 may be omitted.

(3) In the foregoing embodiment, there was disclosed an example arrangement in which the intermediate holder 70B and the rear holder 70C are formed as members separate from the transmission case 13. Instead, these may be formed integrally or unitarily with the transmission case 13.

(4) In the foregoing embodiment, there was disclosed an example arrangement in which two spacers 86 are provided. However, this arrangement is not limiting. No spacer 86 at all may be provided. Further, the arrangement may include only one spacer 86 or include three or more spacers 86.

(5) In the foregoing embodiment, there was disclosed an example arrangement in which the upper cover portions 100U, 110U are extended respectively from only the first side wall portions of the lower cover portions 100D, 110D. Instead, these may be extended from both the first side wall portions and the second side wall portions of the lower cover portions 100D, 110D.

(6) In the foregoing embodiment, there was disclosed an example arrangement employing the disc springs 39 for urging the front wheel clutch 40 to the engaged state. However, this arrangement is not limiting. For instance, the arrangement may employ various kinds of urging members such as coil spring, etc.

(7) In the foregoing embodiment, there was disclosed an example arrangement employing the coil spring 68 for urging the front wheel acceleration clutch 60 to the disengaged state. However, this arrangement is not limiting. For instance, the arrangement may employ various kinds of urging members such as disc spring, etc.

INDUSTRIAL APPLICABILITY

The present invention is applicable to an arrangement having an electric motor as a power source instead of an engine or an arrangement having an engine and an electric motor as power sources.

DESCRIPTION OF SIGNS

1: front wheel
2: rear wheel
4: power source (engine)
13: transmission case
21: front wheel differential mechanism
22: rear wheel differential mechanism
23: transmission
27: rear wheel transmission shaft
29: front wheel transmission shaft
36: emergency brake
39: first urging member (disc spring)
40: front wheel clutch
49: first hydraulic piston
54: urging force transmitting member
60: front wheel acceleration clutch
60a: upper end portion
63: rotational member (clutch drum)
67: second hydraulic piston
68: second urging member (coil spring)
70B: holder (intermediate holder)
70C: second holder (rear holder)
77: bearing
79: wall portion
84: wall portion 86: spacer
91: first operational oil passage
94: second operational oil passage
100: acceleration clutch cover
100K: opening
100t: upper end
101: first side wall portion
102: second side wall portion
110: front wheel clutch cover
110K: opening
110t: upper end
110U: upper cover portion
X: axis
Y: axis

The invention claimed is:

1. A traveling transmission device for a tractor, comprising:
a front wheel differential mechanism transmitting power to left and right front wheels;
a rear wheel differential mechanism transmitting power to left and right rear wheels; and
a transmission configured to input power from a power source and to transmit the inputted power to the front wheel differential mechanism and the rear wheel differential mechanism;
wherein the transmission includes:
a front wheel transmission shaft transmitting power to the front wheel differential mechanism;
a front wheel clutch that can be switched over between an engaged state for transmitting power to the front wheel transmission shaft in such a manner that an average circumferential speed of the left and right front wheels is set equal to an average circumferential speed of the left and right rear wheels and a disengaged state for disconnecting power transmission to the front wheel transmission shaft; and
a front wheel acceleration clutch that can be switched over between an engaged state for transmitting power to the front wheel transmission shaft in such a manner that the average circumferential speed of the left and right front wheels is set higher than the average circumferential speed of the left and right rear wheels and a disengaged state for disconnecting power transmission to the front wheel transmission shaft;
wherein the front wheel clutch and the front wheel acceleration clutch are supported by the front wheel transmission shaft side by side in an axis direction of the front wheel transmission shaft;
wherein between the front wheel clutch and the front wheel acceleration clutch, there is provided a holder rotatably supporting the front wheel transmission shaft;
wherein a first operational oil passage for switching over the front wheel clutch is formed respectively in and between the front wheel transmission shaft and the holder; and
wherein a second operational oil passage for switching over the front wheel acceleration clutch is formed respectively in and between the front wheel transmission shaft and the holder.

2. The traveling transmission device for the tractor of claim 1, wherein:
the holder includes a supporting portion rotatably engageable with a rotational member of the front wheel acceleration clutch for supporting the rotational member; and
a bearing is interposed between the rotational member and the supporting portion.

3. The traveling transmission device for the tractor of claim 1, wherein:
a transmission case is provided for accommodating the transmission;
the holder is provided separately of the transmission case and supported by one wall portion of the transmission case;
a second holder is provided for rotatably supporting the front wheel transmission shaft at a position opposite to the front wheel clutch relative to the front wheel acceleration clutch; and
the second holder is provided separately of the transmission case and supported by a further wall portion of the transmission case than the one wall portion.

4. The traveling transmission device for the tractor of claim 3, wherein there is provided a spacer coupled to a portion of the holder apart from the one wall portion of the holder and a portion of the second holder apart from the further wall portion and configured to set a spacing between the holder and the second holder.

5. The traveling transmission device for the tractor of claim 1, further comprising:
a first urging member urging the front wheel clutch to the engaged state;
a first hydraulic piston provided in the front wheel clutch and operable by pressure oil supplied via the first operational oil passage for operating the front wheel clutch to the disengaged state against the first urging member;
a second urging member urging the front wheel acceleration clutch to the disengaged state;
a second hydraulic piston provided in the front wheel acceleration clutch and operable by pressure oil supplied via the second operational oil passage for operating the front wheel acceleration cutch to the engaged state against the second urging member;
the first urging member being provided between the front wheel clutch and the holder; and
an urging force transmitting member slidably supported by the front wheel transmission shaft and configured to transmit an urging force of the first urging member to the first hydraulic piston.

6. The traveling transmission device for the tractor of claim 5, wherein the first urging member comprises a disc spring.

7. The traveling transmission device for the tractor of claim 6, further comprising:
a rear wheel transmission shaft provided parallel with the front wheel transmission shaft and transmitting power to the rear wheel differential mechanism; and
an emergency brake provided in the rear wheel transmission shaft, an outer circumferential portion of the emergency brake being interposed between the front wheel clutch and the disc spring.

8. The traveling transmission device for the tractor of claim 1, further comprising:
a transmission case accommodating the transmission, the front wheel acceleration clutch being disposed downwardly of an inside space of the transmission case; and
an acceleration clutch cover provided in the inside space and covering the front wheel acceleration clutch, the acceleration clutch cover having an upwardly formed opening.

9. The traveling transmission device for the tractor of claim 1, further comprising:

a transmission case accommodating the transmission, the front wheel clutch being disposed downwardly of an inside space of the transmission case; and a front wheel clutch cover provided in the inside space and covering the front wheel clutch, the front wheel clutch cover having an upwardly formed opening.

10. A traveling transmission device for a tractor, comprising:

a front wheel differential mechanism transmitting power to left and right front wheels;

a rear wheel differential mechanism transmitting power to left and right rear wheels;

a transmission configured to input power from a power source and to transmit the inputted power to the front wheel differential mechanism and the rear wheel differential mechanism; and a transmission case accommodating the transmission;

wherein the transmission includes:

a front wheel transmission shaft transmitting power to the front wheel differential mechanism;

a front wheel clutch transmitting power to the front wheel transmission shaft in such a manner that an average circumferential speed of the left and right front wheels is set equal to an average circumferential speed of the left and right rear wheels; and a front wheel acceleration clutch transmitting power to the front wheel transmission shaft in such a manner that the average circumferential speed of the left and right front wheels is set higher than the average circumferential speed of the left and right rear wheels, the front wheel acceleration clutch being disposed downwardly of an inside space of the transmission case; and an acceleration clutch cover provided in the inside space and covering the front wheel acceleration clutch, the acceleration clutch cover having an upwardly formed opening.

11. The traveling transmission device for the tractor of claim 10, further comprising a rear wheel transmission shaft provided upwardly of the front wheel transmission shaft and transmitting power to the rear wheel differential mechanism, and wherein an upper end of the acceleration clutch cover is positioned at a same height as an axis of the rear wheel transmission shaft or at a position higher than the axis.

12. The traveling transmission device for the tractor of claim 10, wherein the acceleration clutch cover includes a lower cover portion positioned downwardly of an upper end portion of the front wheel acceleration clutch and an upper cover portion extended upwards from the lower cover portion.

13. The traveling transmission device for the tractor of claim 12, wherein:

the front wheel acceleration clutch has a clutch drum having opposed side portions;

the lower cover portion includes a first side wall portion corresponding to one side portion rotated in a rising direction as seen in a direction along a rotational axis of the clutch drum at the time of transmission of forward traveling power and a second side wall portion corresponding to the other side portion rotated in a descending direction as seen in the direction at the time of transmission of forward traveling power; and the upper cover portion is extended upwards from only the first side portion of the first side portion and the second side portion.

14. The traveling transmission device for the tractor of claim 10, wherein:

the front wheel clutch is disposed downwardly of an inside space of the transmission case; and a front wheel cover clutch is provided in the inside space for covering the front wheel clutch.

15. The traveling transmission device for the tractor of claim 14, further comprising a rear wheel transmission shaft provided upwardly of the front wheel transmission shaft and transmitting power to the rear wheel differential mechanism, and wherein an upper end of the front wheel clutch cover is positioned at a same height as an axis of the rear wheel transmission shaft or at a position higher than the axis.

* * * * *